(12) United States Patent
Imamura

(10) Patent No.: US 11,573,739 B2
(45) Date of Patent: Feb. 7, 2023

(54) INFORMATION PROCESSING APPARATUS AND METHOD TO CONTROL MEMORY ACCESS AND COMPUTER-READABLE RECORDING MEDIUM HAVING STORED THEREIN CONTROL PROGRAM TO CONTROL MEMORY ACCESS

(71) Applicant: FUJITSU LIMITED, Kawasaki (JP)

(72) Inventor: Satoshi Imamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 42 days.

(21) Appl. No.: 17/156,677

(22) Filed: Jan. 25, 2021

(65) Prior Publication Data

US 2021/0326071 A1    Oct. 21, 2021

(30) Foreign Application Priority Data

Apr. 16, 2020 (JP) .............................. JP2020-073253

(51) Int. Cl.
  *G06F 3/06*    (2006.01)
(52) U.S. Cl.
  CPC ............ *G06F 3/0659* (2013.01); *G06F 3/061* (2013.01); *G06F 3/068* (2013.01); *G06F 3/0622* (2013.01);
  (Continued)
(58) Field of Classification Search
  CPC ...... G06F 3/061; G06F 3/0622; G06F 3/0653; G06F 3/0659; G06F 3/0673; G06F 3/068; G06F 2212/205
  (Continued)

(56) References Cited

U.S. PATENT DOCUMENTS 6,173,356 B1 * 1/2001 Rao ..................... G06F 12/0806
                                                       712/E9.047
6,185,151 B1    2/2001 Cho
                        (Continued)

FOREIGN PATENT DOCUMENTS

JP    2001-006366 A    1/2001
JP    2007-004861 A    1/2007

OTHER PUBLICATIONS

Camélia Slimani, Stéphane Rubini, and Jalil Boukhobza. 2019. HyMAD: a hybrid memory-aware DVFS strategy. SIGBED Rev. 16, 3 (Oct. 2019), 45-50. https://doi.org/10.1145/3373400.3373407 (Year: 2019).*

(Continued)

*Primary Examiner* — Reginald G Bragdon
*Assistant Examiner* — Aaron D Ho
(74) *Attorney, Agent, or Firm* — Fujitsu Patent Center

(57) ABSTRACT

An information processing apparatus includes: a first memory; a second memory different in processing speed from the first memory; and a processor including: a memory controller that is coupled to the first memory and the second memory and that controls an access to the first memory and an access to the second memory; and a plurality of controllers that access to the first memory or the second memory. The processor is configured to suppress a writing frequency of data into the second memory by controlling one or more first controllers that access the second memory among the plurality of controllers in accordance with a result of monitoring a state of writing the data into the second memory.

11 Claims, 15 Drawing Sheets

(52) U.S. Cl.
CPC ...... *G06F 3/0673* (2013.01); *G06F 2212/205* (2013.01)

(58) Field of Classification Search
USPC .......................................................... 711/163
See application file for complete search history.

(56) References Cited

U.S. PATENT DOCUMENTS

| | | | | |
|---|---|---|---|---|
| 9,250,999 | B1* | 2/2016 | Barroso | G06F 11/1064 |
| 2006/0291291 | A1 | 12/2006 | Hosono et al. | |
| 2011/0119672 | A1* | 5/2011 | Ramaraju | G06F 9/5044 |
| | | | | 718/102 |
| 2015/0370303 | A1* | 12/2015 | Krishnaswamy | G06F 1/3243 |
| | | | | 713/322 |
| 2016/0180916 | A1* | 6/2016 | Mekhiel | G11C 7/1039 |
| | | | | 711/105 |
| 2016/0239213 | A1* | 8/2016 | Liu | G06F 11/3471 |
| 2017/0068620 | A1* | 3/2017 | Kim | G06F 9/3851 |
| 2017/0160953 | A1* | 6/2017 | Hirata | G06F 3/0679 |
| 2019/0042432 | A1* | 2/2019 | Khade | G06F 11/3409 |
| 2019/0190805 | A1* | 6/2019 | Hunt | G06F 11/3433 |
| 2019/0243557 | A1* | 8/2019 | Joshi | G06F 3/0647 |
| 2020/0026566 | A1* | 1/2020 | Baggerman | G06F 40/186 |
| 2020/0159444 | A1* | 5/2020 | Jo | G06F 3/0611 |

OTHER PUBLICATIONS

M. Zhou, Y. Du, B. R. Childers, R. Melhem and D. Mossé, "Writeback-aware bandwidth partitioning for multi-core systems with PCM," Proceedings of the 22nd International Conference on Parallel Architectures and Compilation Techniques, 2013, pp. 113-122, doi: 10.1109/PACT.2013.6618809. (Year: 2013).*

Eiman Ebrahimi, Chang Joo Lee, Onur Mutlu, and Yale N. Patt. 2012. Fairness via Source Throttling: A Configurable and High-Performance Fairness Substrate for Multicore Memory Systems. ACM Trans. Comput. Syst. 30, 2, Article 7 (Apr. 2012), 35 pages, https://doi.org/10.1145/2166879.2166881 (Year: 2012).*

Y. Li, S. Ghose, J. Choi, J. Sun, H. Wang and O. Mutlu, "Utility-Based Hybrid Memory Management," 2017 IEEE International Conference on Cluster Computing (CLUSTER), 2017, pp. 152-165, doi: 10.1109/CLUSTER.2017.130. (Year: 2017).*

S. Lee, H. Bahn and S. H. Noh, "CLOCK-DWF: A Write-History-Aware Page Replacement Algorithm for Hybrid PCM and DRAM Memory Architectures," in IEEE Transactions on Computers, vol. 63, No. 9, pp. 2187-2200, Sep. 2014, doi: 10.1109/TC.2013.98. (Year: 2014).*

* cited by examiner

FIG.9

EXAMPLE OF CALCULATION RESULT

23

| CORE ID | STORE RATIO | DRAM ACCESS RATIO | PMEM ACCESS RATIO |
|---|---|---|---|
| 0 | 0.2 | 1.0 | 0.0 |
| 1 | 1.0 | 0.0 | 1.0 |
| 2 | 0.8 | 0.5 | 0.5 |
| 3 | 0.0 | 0.8 | 0.2 |
| : | : | : | : |

FIG.10

EXAMPLE OF ID LIST
~24

| CORE ID |
|---------|
| 1 |
| 2 |

INFORMATION PROCESSING APPARATUS AND METHOD TO CONTROL MEMORY ACCESS AND COMPUTER-READABLE RECORDING MEDIUM HAVING STORED THEREIN CONTROL PROGRAM TO CONTROL MEMORY ACCESS

CROSS-REFERENCE TO RELATED APPLICATION

This application is based upon and claims the benefit of priority of the prior Japanese Patent application No. 2020-073253, filed on Apr. 16, 2020, the entire contents of which are incorporated herein by reference.

FIELD

The embodiment discussed herein is directed to an information processing apparatus to control memory access and a computer-readable recording medium having stored therein a control program to control memory access.

BACKGROUND

In an information processing apparatus such as a server or a Personal Computer (PC), an access to a main storage device exemplified by a memory, such as a Dynamic Random Access Memory (DRAM), is made by a processor such as a Central Processing Unit (CPU).

A processor includes one or more CPU cores (sometimes simply referred to as "cores") and a memory controller (hereinafter, sometimes referred to as "MC"). The core executes a process (may be referred to as a "program") that accesses data stored in the memory, and the MC controls an access to a memory serving as an access target of the process to be executed.

[Patent Document 1] Japanese Laid-open Patent Publication No. 2001-006366

[Patent Document 2] Japanese Laid-open Patent Publication No. 2007-004861

In recent years, memories adopting the next generation memory technique have appeared. As such a memory, a memory adopting, for example, Intel Optane DC Persistent Memory (hereinafter, sometimes referred to as "PMEM" or "PM") (registered trademark) employing 3D XPoint (registered trademark) technique is known.

A PMEM is lower in processing performance (in particular, writing performance) as compared with a DRAM, but has an inexpensive unit price per capacity and a large capacity. As an example, a PMEM has one-tenth the processing performance of a DRAM and a ten times the storage capacity (size of the storage region) of a DRAM.

Like the DRAM, the PMEM can be mounted on a memory slot, such as a Dual Inline Memory Module (DIMM) slot. For the above, the MC controls accesses both to the DRAM and the PMEM. In other words, the DRAM, which is an example of a first memory, and the PMEM, which is an example of a second memory being different in process performance (process speed) from the DRAM, coexist in the same storage (memory) layer.

For example, when multiple processes including a process for accessing the DRAM and a process for accessing the PMEM are executed in parallel in a single processor, a conflict sometimes occurs between a process on the DRAM and a process on the PMEM in the MC.

Accordingly, such a conflict of processes in the MC may increase a processing time (processing delay) of at least one process, for example.

SUMMARY

According to an aspect of the embodiment, an information processing apparatus includes: a first memory; a second memory different in processing speed from the first memory; and a processor, the processor including: a memory controller that is coupled to the first memory and the second memory and that controls an access to the first memory and an access to the second memory; and a plurality of controllers that access to the first memory or the second memory. The processor is configured to suppress a writing frequency of data into the second memory by controlling one or more first controllers that access the second memory among the plurality of controllers in accordance with a result of monitoring a state of writing the data into the second memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram illustrating an example of a calculation result;

FIG. 10 is a diagram illustrating an example of an ID list;

DESCRIPTION OF EMBODIMENT(S)

Figure 1:
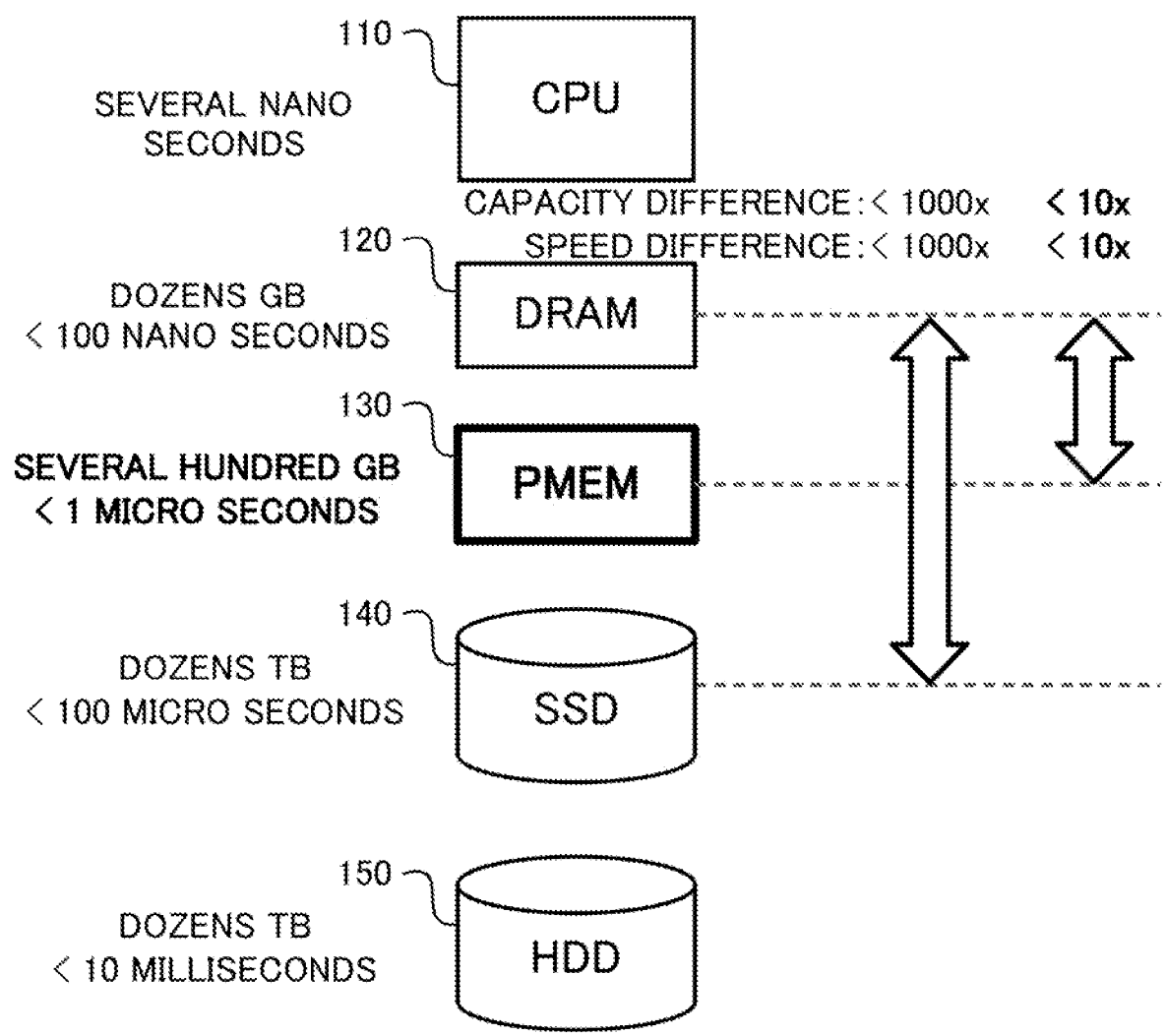
FIG. 1 is a diagram illustrating an example of a process speed and a storage capacity of each component provided in an information processing apparatus.

Hereinafter, an embodiment of the present invention will now be described with reference to the accompanying drawings. However, the embodiment described below is merely illustrative and is not intended to exclude the application of various modifications and techniques not explicitly described below. For example, the present embodiment can be variously modified and implemented without departing from the scope thereof. In the drawings to be used in the following description, the same reference numbers denote the same or similar parts, unless otherwise specified.

[1] One Embodiment

[1-1] Hybrid Memory System Using DRAM and PMEM:

FIG. 1 is a diagram illustrating an example of process speeds (process performances) of components (modules) 110 to 150 provided in an information processing apparatus and, if the component is a storage device, the storage capacity thereof.

As exemplarily illustrated in FIG. 1, aligning the components in the descending order of a process speed results in a CPU 110, a DRAM 120, a PMEM 130, an SSD (Solid State Drive) 140, and a HDD (Hard Disk Drive) 150. Aligning the components in the descending order of a storage capacity results in the HDD 150, the SSD 140, the PMEM 130, and the DRAM 120. Being compared with the SSD 140, the DRAM 120 has a process speed of about 1000 times, and a storage capacity of about one thousandth. The PM 130 is positioned between the DRAM 120 and the SSD 140 in terms of the process speed and the storage capacity, and when being compared with the PMEM 130, the DRAM 120 has a process speed of about ten times and a storage capacity of about one tenth.

This means that although being lower in process performance (particularly, writing performance) and lower in writing tolerance than the DRAM 120, the PMEM 130 is less expensive and larger in volume than the DRAM 120. Similar to the DRAM 120, the PMEM 130 can be accessed in a unit of a byte and can be mounted on a memory slot such as a DIMM slot. Furthermore, since the PMEM 130 is non-volatile unlike the DRAM 120, the data in the PM 130 does not vanish when the power supply is cut off.

For these reasons, it is expected that an information processing apparatus mounting thereon both the DRAM 120 and the PMEM 130 as memory (main storage device) will become popular.

Figure 2:
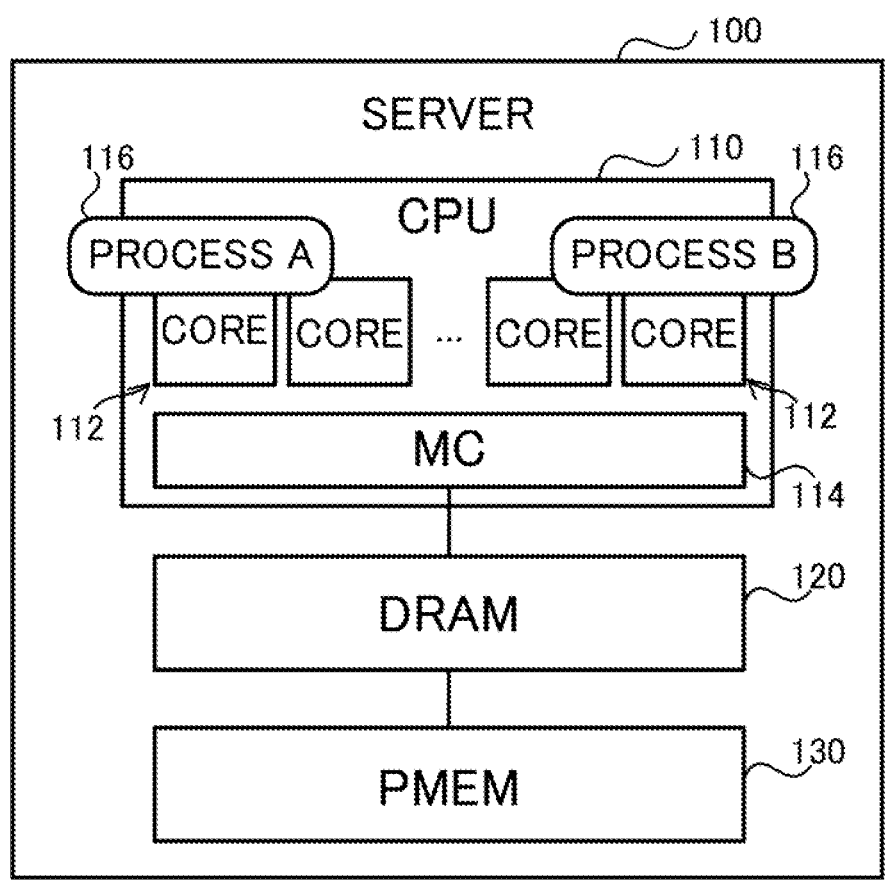
FIG. 2 is a block diagram schematically illustrating an example of a hardware (HW) configuration of a server in which both DRAMs and PMEMs are mounted as memories.

FIG. 2 is a block diagram schematically illustrating an example of a hardware (HW) configuration of a server 100 in which both DRAMs 120 and PMEMs 130 are mounted as memories.

As illustrated in FIG. 2, the server 100 is illustratively provided with one or more (one in the example of FIG. 2) CPU sockets, each of which includes the CPU 110 serving as an example of the processor. The server 100 constitutes a hybrid memory system by using the DRAMs 120 and the PMEMs 130. In the hybrid memory system, the DRAM 120 serving as an example of a first memory and the PMEM 130 serving as an example of a second memory different in process performance (process speed) from the DRAM 120 coexist in the same storage (memory) layer.

The CPU 110 includes multiple cores 112 and a memory controller (MC) 114.

In each CPU socket, in a single CPU 110, multiple processes ("PROCESS A" and "PROCESS B" in the example of FIG. 2) 116 are executed simultaneously (in parallel). For example, the CPU 110 may execute the processes 116 using respective different cores 112 from each other to avoid conflict of processing resources of the cores 112. Alternatively, two or more cores 112 may execute a single process 116.

The MCs 114 of the respective CPUs 110 connected to one or more DRAMs 120 (one in the example of FIG. 2) and one or more PMEMs 130 (one in the example of FIG. 2) via the same memory channel, and manages (controls) both the DRAMs 120 and the PMEMs 130.

Each process 116 accesses one of or both the DRAM 120 and the PMEM 130. For example, in FIG. 2, a process A accesses the DRAM 120 and a process B accesses the PMEM 130.

Since the accesses to the DRAM 120 and the PMEM 130 by the processes A and B are controlled by the common MC 114, a conflict of the MC 114 may occur between an access to the DRAM 120 and an access to the PMEM 130.

Figure 3:
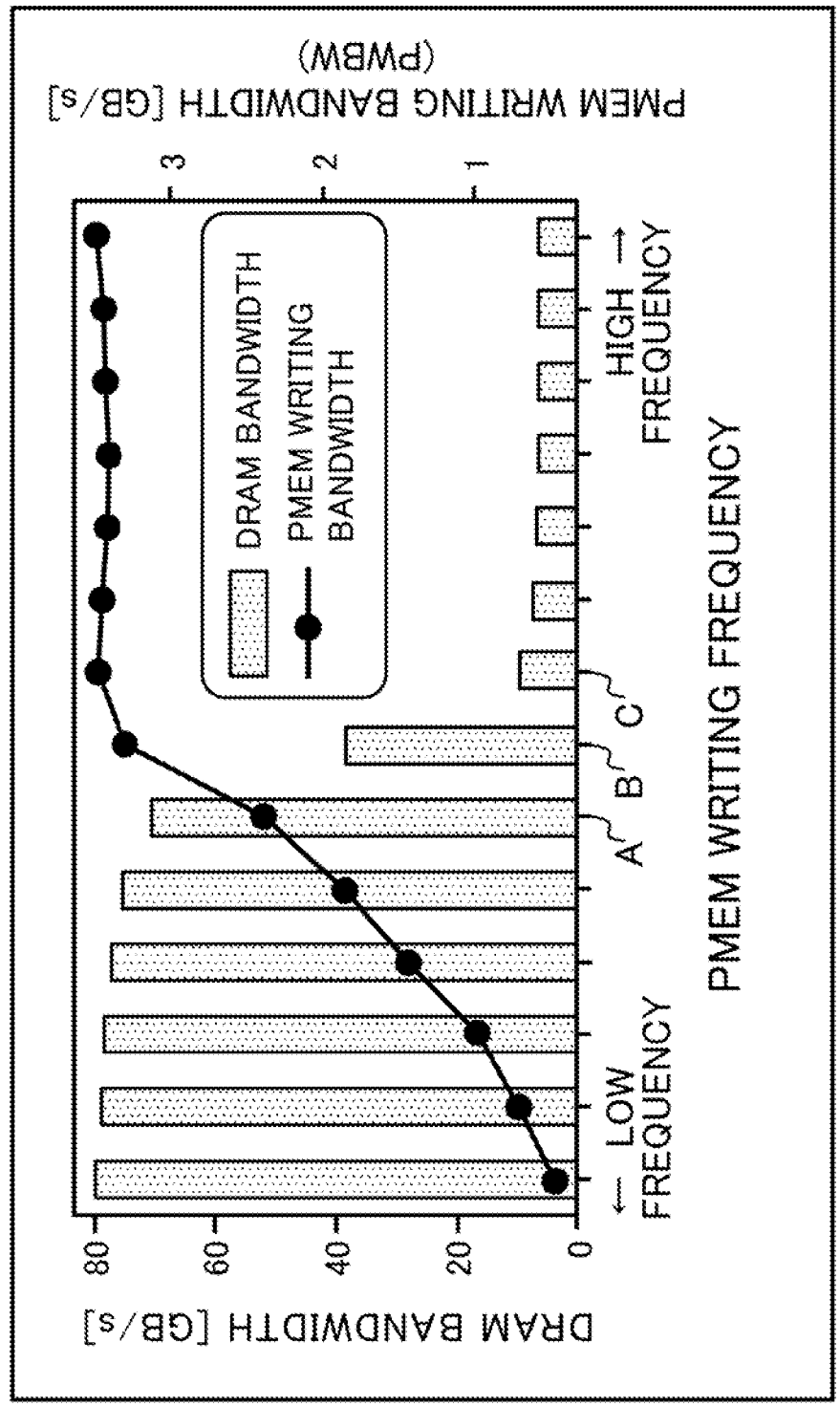
FIG. 3 is a diagram illustrating an example of a writing frequency into the PMEM by a process B of FIG. 2.

FIG. 3 is a diagram illustrating an example of a writing frequency into the PMEM 130 by the process B. In FIG. 3, the horizontal axis indicates a writing frequency into the PMEM 130. The left vertical axis (bar graph) indicates the access bandwidth [GB/s] to the DRAM 120 according to the writing frequency into the PMEM 130. The right vertical axis (line chart) indicates the writing bandwidth [GB/s] into the PMEM 130 according to the writing frequency into the PMEM 130.

As illustrated in FIG. 3, when the writing frequency into the PMEM 130 is equal to or less than or the frequency indicated by the reference symbol A (low frequency), the access bandwidth to the DRAM 120 by the process A is approximately constant at about 70 to 80 GB/s. However, it can be seen that, when the writing frequency into the PMEM 130 is equal to or more than the reference symbol A (high frequency), for example, the bandwidth sharply decreases as the frequency increases from the reference symbol A to the reference symbol C, and particularly decreases to about 7 to 8 GB/s (about ¹⁄₁₀ at low frequency) when the frequency is larger than the symbol C.

On the other hand, when the writing frequency into the PMEM 130 is equal to or less than the frequency indicated by the reference symbol A (low frequency), the access bandwidth to the PMEM 130 by the process B gradually increases to about 0.3-3.2 GB/s as the frequency increases. However, it can be seen that the bandwidth becomes saturated when the writing frequency into the PMEM 130 is equal to or larger than the reference symbol B, and peaks at about 3.2-3.5 GB/s.

Thus, if the process B writes data into the PMEM 130 at a writing frequency (high frequency) equal to or higher than, for example, the frequency (high frequency) indicated by reference symbol A, an access to the DRAM 120 by the process A may largely delay.

In terms of performance fairness between the process A and the process B, it is ideal that the performances of both the process A and the process B are reduced by about 50% to the respective reference performances when the process A or the process B solely accesses the DRAM 120 or the PMEM 130.

However, the above-mentioned idealized performance degradation becomes unbalanced by the conflict of the MC 114. As a result, as illustrated in FIG. 3, the performance of the process B, which performs highly-frequent writing into PMEM 130, hardly deteriorates with respect to the reference performance. On the other hand, as illustrated in FIG. 3, the performance of the process A, which accesses the DRAM 120 deteriorates by about 90%, which largely exceeds 50%, with respect to the reference performance.

As the above, in the hybrid memory system may undergo an unfair memory access between the process A that accesses the DRAM 120 and the process B that writes data into the PMEM 130 at a high frequency. In cases where the process A conflicts with the process B in the MC 114, the processing time (processing delay) of the process A increases in the MC 114.

As a solution to the above, in the one embodiment, description will now be made in relation to a method of suppressing a decrease in processing performance in an information processing apparatus including a processor having a common memory controller that controls accesses made by processes to a first memory and a second memory having different processing speeds.

Figure 4:
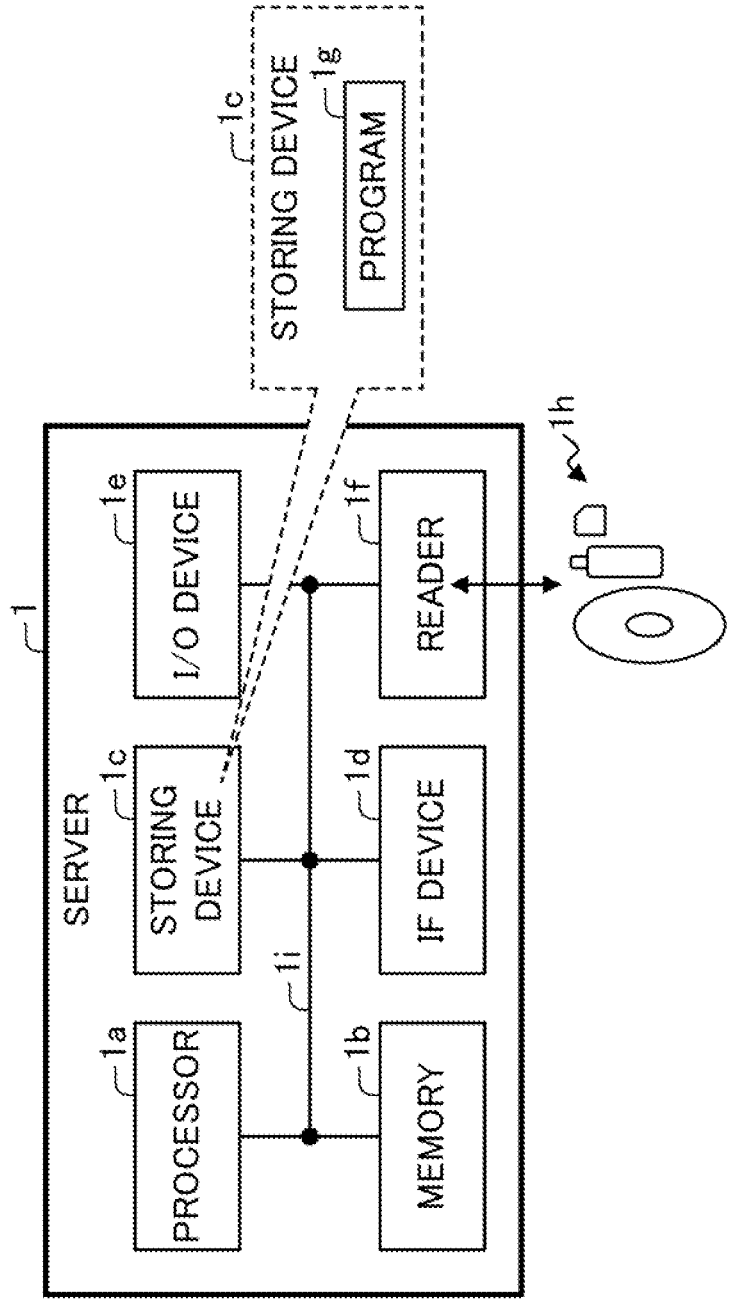
FIG. 4 is a block diagram schematically illustrating an example of a HW configuration of the server according to one embodiment.

[1-2] Example of Configuration of One Embodiment:

[1-2-1] Example of Hardware Configuration:

FIG. 4 is a block diagram illustrating an example of the HW configuration of a server 1 according to the one embodiment. The server 1 is an example of an information processing apparatus. As an alternative to the server, an example of the information processing apparatus is various computers such as PCs or mainframes. The server 1 may include, by way of example, a processor 1a, a memory 1b, a storing device 1c, an IF (Interface) device 1d, an I/O (Input/Output) device 1e, and a reader if as HW configuration.

The processor 1a is an example of a processor that performs various controls and calculations. The processor 1a may be communicably coupled to each block in the server 1 through a bus 1i. In the one embodiment, the processor 1a may be a multi-processor including multiple processors (e.g., multiple CPUs). Each of the multiple processors may be a multi-core processor having multiple processor cores.

Figure 5:
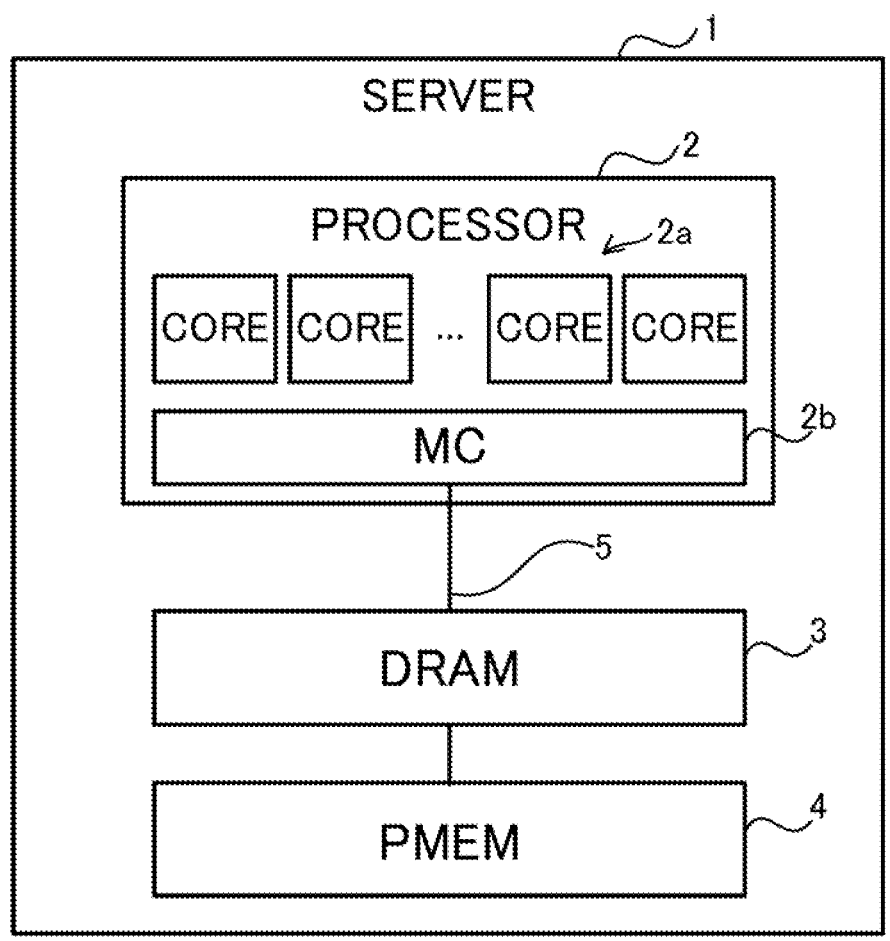
FIG. 5 is a block diagram schematically illustrating an example of a HW configuration focusing on processors and memories of the server according to the one embodiment.

FIG. 5 is a block diagram illustrating an example of the HW configuration focusing on the processor 1a and the memory 1b of the server 1 according to the one embodiment. As illustrated in FIG. 5, the processor 1a illustrated in FIG. 4 may be one or more (one in the example of FIG. 5) processors 2. The processor 2 may include multiple cores 2a and a MC 2b.

The MC 2b is connected to one or more (one in the example of FIG. 5) DRAMs 3 and one or more (one in the example of FIG. 5) PMEMs 4 through the same (common) memory channel 5 to manage (control) both the DRAM 3 and the PMEM 4.

In other words, the MC 2b is one example of a common memory controller that controls accesses made by processes to the DRAM 3 and the PMEM 4. For example, the MC 2b may be shared by both an access by a process directed to the DRAM 3 and an access by a process directed to the PMEM 4.

Examples of the processor 1a include an integrated circuit (IC), such as a Micro Processing Unit (MPU), a Graphics Processing Unit (GPU), an Accelerated Processing Unit (APU), a Digital Signal Processor (DSP), an Application Specific IC (ASIC), and a Field-Programmable Gate Array (FPGA) in place of a Central Processing Unit (CPU).

Referring back to the description of FIG. 4, the memory 1b is an example of a HW device that stores various data pieces and information such as a program. Example of the Memory 1b includes both a volatile memory such as a DRAM and a non-volatile memory such as a 6 PMEM. This means that the server 1 according to the one embodiment may achieve a hybrid memory system that uses a DRAM and a PMEM.

For example, as illustrated in FIG. 5, the memory 1b may include one or more DRAMs 3 and one or more PMEMs 4 for one processor 2. The DRAM 3 is an example of the first memory, and the PMEM 4 is an example of a second memory that differs (e.g., is slow) in process speed from the first memory.

The example of FIG. 5 assumes that, for simplicity of description, a single processor 2 is provided with one DRAM 3 and one PMEM 4, but the configuration is not limited this. For example, a single processor 2 may be provided with two or more groups (sets) of a DRAM 3 and a PMEM 4 for each MC 2b. In the example of FIG. 5, the DRAM 3 and the PMEM 4 are connected to the MC 2b in a cascaded manner, but the connection is not limited to a cascade. Alternatively, the DRAM 3 and the PMEM 4 may be connected to the MC 2b in parallel with each other through a circuit such as a buffer.

Referring back to the description of FIG. 4, the storing device 1c is an example of a HW device that stores various data pieces and information such as a program. Examples of the storing device 1c include various storage devices of a semiconductor drive device such as an SSD, a magnetic disk device such as a HDD, and a non-volatile memory. Examples of the nonvolatile memory include a flash memory, a Storage Class Memory (SCM), and a Read Only Memory (ROM).

The storing device 1c may also store a program 1g that implements all or some of the various functions of the server 1. For example, the processor 1a of the server 1 can achieve a function as a processing unit 10 to be described below with reference to FIG. 6 by expanding the program 1g (control program) stored in the storing device 1c on the memory 1b and executing the expanded program 1g. The functions of the processing unit 10 may include the functions of the control process 20 and the multiple processes 30, which will be described below.

The IF device 1d is an example of a communication IF that controls the connection to and the communication with a non-illustrated network. For example, the IF device 1d may include adapters compliant with LAN (Local Area Network) such as Ethernet (registered trademark), or optical communication (e.g., FC (Fibre Channel), or the like. For example, the program 1g may be downloaded from a network to the server 1 via the communication IF and stored into the storing device 1c.

The I/O device 1e may include one or both of an input device, such as a mouse, a keyboard, or an operating button, and an output device, such as a touch panel display, a monitor, such as a Liquid Crystal Display, a projector, or a printer.

The reader if is an example of a reader that reads data and programs recorded on the recording medium 1h. The reader if may include a connecting terminal or a device to which the recording medium 1h can be connected or inserted. Examples of the reader if include an adapter conforming to, for example, Universal Serial Bus (USB), a drive apparatus that accesses a recording disk, and a card reader that accesses a flash memory such as an SD card. The program 1g may be stored in the recording medium 1h, and the reader if may read the program 1g from the recording medium 1h and store the program 1g into in the storing device 1c.

The recording medium 1h is example of a non-transitory recording medium such as a magnetic/optical disk, and a flash memory. Examples of the magnetic/optical disk include a flexible disk, a Compact Disc (CD), a Digital Versatile Disc (DVD), a Blu-ray disk, and a Holographic Versatile Disc (HVD). Examples of the flash memory include a semiconductor memory such as a USB memory and an SD card.

The HW configuration of the server 1 described above is merely illustrative. Accordingly, the server 1 may appropriately undergo increase or decrease of HW (e.g., addition or deletion of arbitrary blocks), division, integration in an arbitrary combination, and addition or deletion of the bus.

Figure 6:
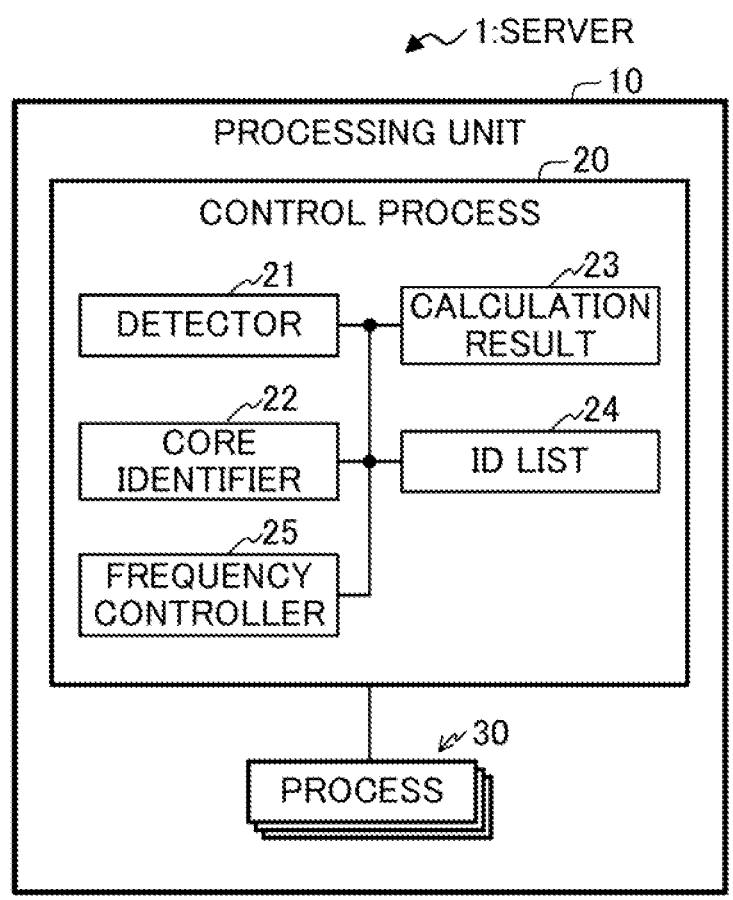
FIG. 6 is a block diagram schematically illustrating an example of a functional configuration of the server according to the one embodiment.

[1-2-2] Example of Functional Configuration:

FIG. 6 is a block diagram schematically illustrating an example of a functional configuration of the server 1 according to the one embodiment. As illustrated in FIG. 6, the server 1 may illustratively have a function of the processing unit 10 function when being focused on a function related to control according to the one embodiment. The processing unit 10 may be achieved by the processor 2 of the server 1 illustrated in FIG. 5 executing the program 1g expanded on the DRAM 3 or the PMEM 4.

As illustrated in FIG. 6, the processing unit 10 may illustratively include a control process 20 and multiple processes 30.

Each of multiple processes 30 accesses one of or both the DRAM 3 and the PMEM 4. The process 30 may include an OS-level process that operates in the OS (Operating System) space of the server 1 and a user-level process that operates in the user space exemplified by a process of an application that operates on the OS.

For example, the processor 2 may execute the processes 30 using respective different cores 2a from each other to avoid conflict of processing resources of the cores 2a. Alternatively, two or more cores 2a may execute a single process 30.

The control process 20 may be one of multiple processes 30, e.g., a user-level process. Illustratively, the control process may be a user level runtime system.

Figure 7:
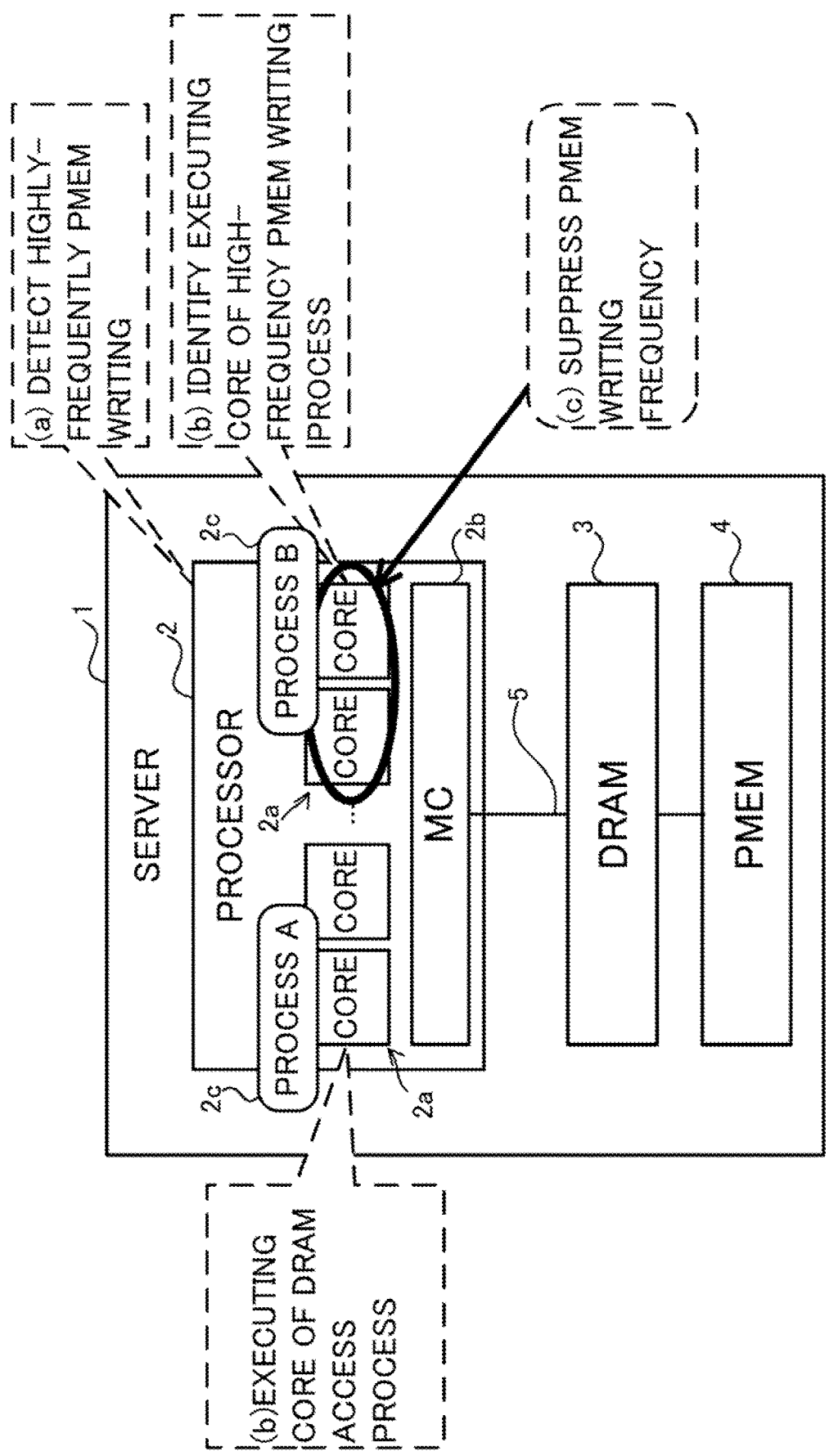
FIG. 7 is a diagram illustrating an example of an operation of the server according to one embodiment.

For example, the control process 20 may execute the following processes (a) to (c) as illustrated in FIG. 7.

(a) The control process 20 detects highly-frequent writing into the PMEM 4. In the example of FIG. 7, the control process 20 detects highly-frequent writing into the PMEM 4 that occurred in the processor 2 (see reference symbol (a)).

(b) The control process 20 identifies at least a second core 2a of a first core 2a that performs the process 30 accessing the DRAM 3 and the second core 2a that performs the process 30 writing into the PMEM 4. In the example of FIG. 7, the control process 20 identifies at least the core 2a that executes the process B that highly-frequently writes data into the PMEM 4 of the core 2a that executes the process A that accesses the DRAM 3 and the core 2a that executes the process B (see the reference symbol (b)).

(c) The control process 20 suppresses the writing frequency into the PMEM 4 by controlling the second core 2a. In the example of FIG. 7, the control process 20 suppresses the writing frequency into the PMEM 4 by controlling the core 2a that executes the process B (see reference symbol (c)).

As described above, according to the server 1 of the one embodiment, the writing frequency into the PMEM 4 can be lowered in the hybrid memory system, and unfair memory accesses between the processes A and B can be eliminated. As a result, even when the process A and the process B conflict with each other in the MC 2b, it is possible to suppress an increase in the processing time (processing delay) of the process A in the MC 2b.

As illustrated in FIG. 6, the control process 20 may illustratively include a detector 21, a core identifier 22, a calculation result 23, an ID LIST 24, and a frequency controller 25.

The calculation result 23 and the ID LIST 24 may be stored in a storage area of at least one of the memory 1b illustrated in FIG. 4 (i.e., the DRAM 3 and/or the PMEM 4 illustrated in FIG. 5) and the storing device 1c, for example. In the following explanation, the calculation result 23 and ID LIST 24 are assumed to have data formats of table formats for convenience, but the present invention is not limited thereto, and various data formats such as an array and a database (Database) may be used.

The detector 21 detects a highly-frequent writing into the PMEM 4. For example, the detector 21 may obtain and monitor the values of a performance counter of the processor 2 and detect highly-frequent writing into the PMEM 4.

For example, the detector 21 can obtain the writing bandwidth (PWBW; PMEM Write Band Width) into the PMEM 4 for the entire processor 2 from the performance counter. The PWBW is an example of a writing state of data into the PMEM 4.

The performance counter is a HW device implemented in processor 2 for monitoring performance. The acquisition of information from the performance counter can be achieved by various known methods, and description thereof will be omitted.

For example, as a result of monitoring PWBW, the detector 21 may detect that highly-frequent writing into the PMEM 4 has occurred when the value of PWBW is equal to or larger than the high threshold value HTh. The detector 21 then instructs the core identifier 22 to identify the core 2a executing the process 30 that performs highly-frequent writing into the PMEM 4.

Figure 8:
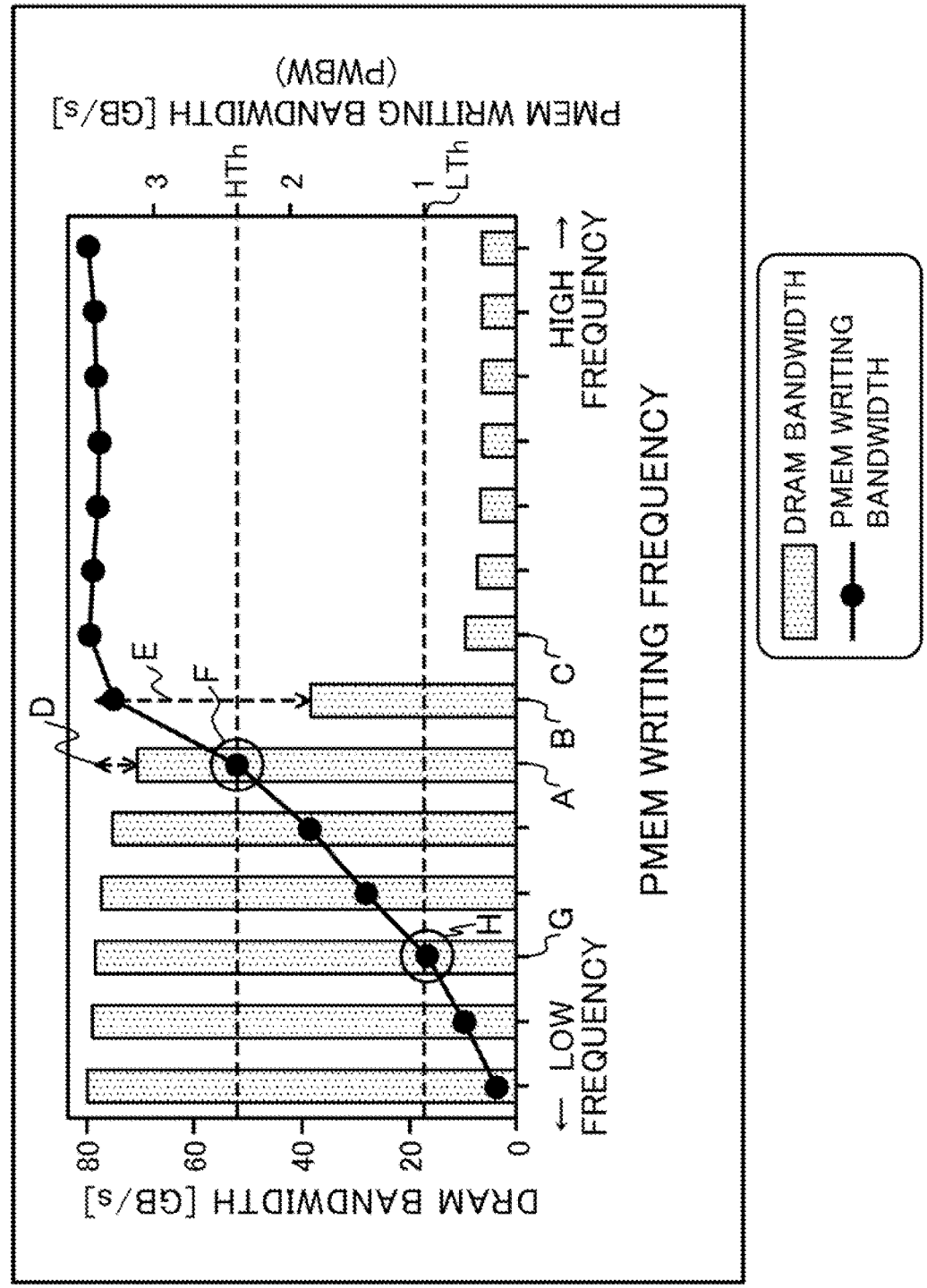
FIG. 8 is a diagram illustrating an example of a writing frequency into the PMEM by a process B of FIG. 7.

The high threshold HTh is an example of a fourth threshold, and may be a PWBW when the writing frequency into the PMEM 4 is high, and a PWBW immediately before the performance of the DRAM 3 is greatly reduced (i.e., the reduction rate increases). For instance, as illustrated in FIG. 8, a correlation between the performances of the DRAM 3 and the PMEM 4 and the writing frequency into the PMEM 4 will now be referred to. In FIG. 8, reference symbols A to C indicate the same PWBW as reference symbols A to C illustrated in FIG. 3.

In the example of FIG. 8, the performance of the DRAM 3 is reduced by the width indicated by the reference symbol D when the writing frequency into the PMEM 4 is the frequency indicated by the reference symbol A, whereas the performance is reduced by the width indicated by the reference symbol E when the frequency is one indicated by the reference symbol B. As described above, the performance reduces by about 12% from the maximum value (80 GB/s) at the time point of the reference symbol A but while the frequency increases from the reference symbol A to the reference symbol B, the performance of the DRAM 3 reduces by about 50% from the maximum value.

In the example illustrated in FIG. 8, 2.4 GB/s, which is a PWBW (see reference symbol F) at the time of the write frequency indicated by reference symbol A, is set in the high threshold value HTh. By setting the PWBW denoted by the reference symbol F to be the high threshold HTh, an instruction can be issued to the core identifier 22 before a significant reduction in the performance of the DRAM 3, and the writing frequency into the PMEM 4 can be suppressed by the control to be described below.

Further, for example, as a monitoring result of PWBW, the detector 21 may detect that the bandwidth of the PMEM 4 still has a margin (not saturated) when the value of the PWBW is equal to or less than the low threshold LTh, In this case, the detector 21 may instruct the frequency controller 25 to increase the access frequency from one or more cores 2a, e.g., all the cores 2a, of the processor 2 to the DRAM 3 and the PMEM 4. The instruction may be, for example, one to increase, e.g., maximize, the operation frequency.

The low threshold value LTh is an example of a fifth threshold, and is a PWBW when the writing frequency into the PMEM 4 is low and the load on the PMEM 4 is low.

In FIG. 8, when the frequency of writing into the PMEM 4 is one indicated by the reference symbol G, the performance of the DRAM 3 is approximately the maximum (approximately 80 GB/s), whereas the performance of the PMEM 4 is approximately 1.0 GB/s, which is approximately 30% of the maximum value (3.5 GB/s).

In the example illustrated in FIG. 8, 1.0 GB/s, which is a PWBW (see reference symbol H) at the time of the write frequency indicated by reference symbol G, is set in the low threshold value LTh. Since the performance of the process 30 that accesses the DRAM 3 does not significantly deteriorate by setting the PWBW indicated by the reference symbol H to be the low threshold LTh, it can be determined that the access frequency to the PMEM 4 does not need to be suppressed.

The correlation illustrated in FIG. 8 (FIG. 3) may be obtained, for example, by obtaining the PWBW and the access bandwidth to the DRAM 3 for a given time period from the performance counter in units of processor 2 in the server 1. Alternatively, the access bandwidth to the DRAM 3 may be calculated on the basis of the result of benchmark in units of process 30.

The high threshold HTh and low threshold LTh may be preset by the server 1 (e.g., the detector 21) on the basis of a value obtained from the performance counter, or may be preset by a user or an administrator of the server 1.

For example, the high threshold HTh may be set to a predetermined percentage value of the maximum value (3.5 GB/s in FIG. 8) of the PWBW or a value smaller than the maximum value by a predetermined value based on the correlation between the respective performances of the DRAM 3 and the PMEM 4 and the writing frequency into the PMEM 4. For example, a predetermined ratio may be about 60% to 80%, and specifically 70% in the example of FIG. 8, and a predetermined value may be about 1.0 GB/s to 1.2 GB/s, and specifically 1.1 GB/s in the example of FIG. 8.

Alternatively, the high threshold HTh may be set to, based on the correlation, a predetermined percentage value of the maximum value of the access bandwidth to the DRAM 3 (80 GB/s in FIG. 8), or a value smaller than the maximum value by a predetermined value. For example, the predetermined ratio may be about 5% to 20%, specifically 12% in the example of FIG. 8, and the predetermined value may be about 5 GB/s to 20 GB/s, for example, 10 GB/s.

Furthermore, for example, the low threshold LTh may be set to a predetermined percentage value of the maximum value (3.5 GB/s in FIG. 8) of the PWBW or a value smaller than the maximum value by a predetermined value based on the correlation. For example, a predetermined ratio may be about 10% to 40%, and specifically 30% in the example of FIG. 8, and a predetermined value may be about 2.0 GB/s to 3.0 GB/s, and specifically 2.5 GB/s in the example of FIG. 8.

As described above, the detector 21 is an example of a notifier that monitors the state of writing data into the PMEM 4 and notifies the core identifier 22 or the frequency controller 25 of the result of the monitoring.

The core identifier 22 identifies the core 2a that is to access the PMEM 4. For example, the core identifier 22 obtains a value of the performance counter of each of multiple cores 2a in response to receiving of an instruction from detector 21, and identifies at least a second core 2a of the first core 2a and the second core 2a on the basis of the obtained value.

The first core 2a is a core 2a that executes the process 30 to access the DRAM 3. The second core 2a is a core 2a that executes the process 30 to write data into the PMEM 4, and is an example of the first controller.

As an example, the core identifier 22 obtains count information related to executing instruction number and the access number for each core 2a from the performance counter. The count information may be, for example, an array or the like in which count values such as the executing instruction number and the access number are associated with each core ID (Identifier), which is an example of the identification information of the core 2a.

The count values may illustratively include an executing instruction number, a load instruction number, a store instruction number, a DRAM access number, and a PMEM access number for each core 2a for a given measuring period. The executing instruction number is the number of instructions executed by the core 2a. The load instruction number is the number of load instructions among the executing instruction number, in other words, the number of read instructions, and the store instruction number is the number of store instruction among the executing instruction number, in other words, the number of writing instructions. The DRAM access number is the number of accesses including writing into and reading from the DRAM 3, and the PMEM access number is the number of accesses including writing into and reading from the PMEM 4.

For example, the core identifier 22 calculates the indices of a store ratio, a DRAM access ratio, and a PMEM access ratio based on the acquired count information for each core 2a, and may store the calculation result 23 serving as the result of calculation into the storage area of the server 1 such as memory 1b.

Here, the store ratio is an example of the ratio of the writing access number to the reading access number, and may be calculated according to the following Equation (1), for example. The DRAM access ratio is an example of the ratio of the access number to the DRAM 3 to the executing instruction number, and may be calculated according to the following Equation (2), for example. The PMEM access ratio is an example of the ratio of the access number to the PMEM 4 to the executing instruction number, and may be calculated according to the following Equation (3), for example.

$$[\text{store ratio}]=[\text{store instruction number}]/[\text{load instruction number}] \quad (1)$$

$$[\text{DRAM access ratio}]=[\text{DRAM access number}]/[\text{executing instruction number}] \quad (2)$$

$$[\text{PMEM access ratio}]=[\text{PMEM access number}]/[\text{executing instruction number}] \quad (3)$$

FIG. 9 is a diagram illustrating an example of the calculation result 23. In the example illustrated in FIG. 9, the store ratio, the DRAM access ratio, and the PMEM access ratio are calculated for at least each of the core IDs "0" to "3".

In cases where a core 2a having a DRAM access ratio larger than a first threshold is present, the core identifier 22 identifies the a core 2a having a PMEM access ratio equal to or larger than a second threshold and having a store ratio equal to or greater than a third threshold on the basis of the calculation result 23.

Then the core identifier 22 generates the ID LIST 24 of the specified cores 2a and instructs the frequency controller 25 to suppress the writing frequency into the PMEM 4 on the basis of the ID LIST 24.

The first threshold may be, for example, a value of 0.0 or more. A core 2a having a DRAM access ratio greater than "0.0", in other words, a core 2a performing a process to access the DRAM 3 at least once, may undergo performance degradation when the writing frequency into the PMEM 4 is increased because the bandwidth of the DRAM 3 reduces.

For the above, in the one embodiment, for example, when the core 2a that executes a user-level process 30 having a relatively large impact on the performance degradation accesses the DRAM 3 at least once in an aggregation period of the count information, the core identifier 22 identifies a (second) core 2a.

However, in an OS-level process 30, an access to the DRAM 3 may occur independently of a user-level process 30. For the above, the one embodiment sets the first threshold to a value of "0.0 or higher", which is the value obtained by adding the DRAM access ratio (e.g., average) that may be increased by the OS-level process 30 to the "0.0", rather than fixing the first threshold to "0.0". In cases where the access ratio to the DRAM 3 by a user-level process 30 can be used as the DRAM access ratio, the first threshold may be "0.0".

The second threshold may be, for example, a value of 0.0 or more. A core 2a having a PMEM access ratio larger than "0.0", in other words, a core 2a that executes the process 30 to access the PMEM 4 at least once, has a possibility of increasing the writing frequency into the PMEM 4.

Therefore, in the one embodiment, for example, in cases where a core 2a that executes a user-level process 30 having a relatively large impact of the performance degradation accesses the PMEM 4 only once, the core 2a is regarded as the (second) core 2a to be identified by core identifier 22.

An OS-level process 30 has a low possibility of accessing the PMEM 4. For this reason, the second threshold value is set to "0.0" or higher in the one embodiment, but may be fixed to "0.0".

The third threshold may be, for example, a value of about "0.1".

As mentioned above, since the PMEM 4 has about 1/10 access performance of the DRAM 3, particularly low in the writing performance, the one embodiment uses a value of about "0.1" as the third threshold.

In the example of FIG. 9, since the core identifier 22 detects the core IDs "0", "2", and "3" as the cores 2a each having a DRAM access ratio larger than the first threshold (e.g., "0.0"). the core identifier 22 is determined to identify the second core 2a.

For example, the core identifier 22 identifies, for example, core IDs "1" and "2" as the core 2a having a PMEM accessing ratio equal to or larger than the second threshold (e.g., "0.0") and a store ratio equal to or larger than the third threshold (e.g., "0.1").

In this case, the core identifier 22 generates the ID LIST 24 including the core IDs "1" and "2" and issues an instruction (notification) to the frequency controller 25.

Figure 10:
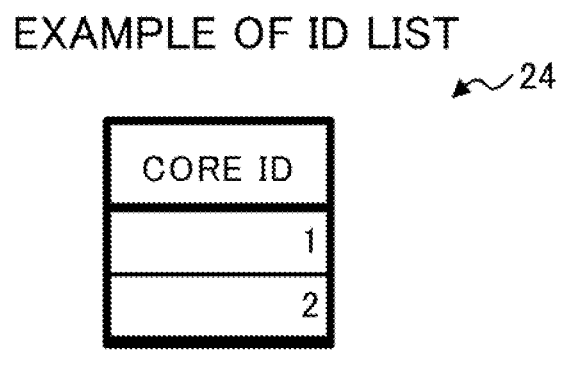

FIG. 10 is a diagram illustrating an example of the ID LIST 24. As illustrated in FIG. 10, the ID LIST 24 may include the core IDs "1" and "2" identified from the calculation result 23 illustrated in FIG. 9.

The frequency controller 25 suppresses the writing frequency into the PMEM 4. For example, the frequency controller 25 controls each of the second cores 2a included in ID LIST 24 based on ID LIST 24 in response to receiving of an instruction from the core identifier 22, and thereby suppresses the writing frequency into the PMEM 4.

For example, as an example of the control on the second cores 2a, the frequency controller 25 suppresses the writing frequency into the PMEM 4 by performing control to lower the operation frequencies of the second cores 2a.

The core 2a operates, for example, at operation frequency corresponding to register values of registers mounted on the core 2a. Accordingly, the frequency controller 25 can change the operation frequency for each core 2a by changing the register values for each core 2a by means of software.

For example, the frequency controller 25 determines, with reference to the register values, whether or not the current operation frequency of the second core 2a included in ID LIST 24 is the lowest settable operation frequency.

Then, in cases where the frequency controller 25 may change the register values so as to lower the operation frequency by one stage if the confirmed current operation frequency is not the lowest settable operation frequency. A "one stage" may be, for example, a minimum unit that can be changed in register values, a predetermined frequency, or a predetermined ratio to the maximum operation frequency of the core 2a.

It the frequency controller 25 may clear (reset) the ID LIST 24 upon determining all the second cores 2a included in the ID LIST 24. In the example of FIG. 10, the frequency controller 25 performs the above-described determination and the control on the operation frequency if the operation frequency is not the lowest operation frequency for each of the core IDs "1" and "2" included in ID LIST 24, and then clears the ID LIST 24.

In this manner, the core identifier 22 identifies the core 2a that is to write data into the PMEM 4, and the frequency controller 25 performs control on each second core 2a identified by the core identifier 22, so that the writing frequency into the PMEM 4 can be surely suppressed.

The frequency controller 25 may also increase the respective operation frequencies of the multiple cores 2a, e.g., all of the cores 2a, in the processor 2 in response to receiving of an instruction from detector 21. For example, the frequency controller 25 may change the register value for each core 2a to maximize the operation frequency of each of all the cores 2a. Incidentally, the frequency controller 25 may change the register value for each core 2a so as to increase the respective operation frequencies of all the cores 2a by one step or multiple stages. This can enhance the process performance of the processor 2.

As the above, the frequency controller 25 is an example of a suppressing processor that suppresses the write frequency of data to the PMEM 4 by controlling the second core 2a (the first controller) that accesses the PMEM 4 according to the result of monitoring the state of writing data into the PMEM 4.

As described above, according to the server 1 of the one embodiment, as illustrated in FIG. 7, the unfair memory access can be resolved between the process A that accesses the DRAM 3 and the process B that highly-frequently writes data into the PMEM 4. In other words, fair memory accessing can be achieved. Therefore, it is possible to suppress the occurrence of conflicts between the process A and the process B in the MC 2*b*, and it is possible to reduce the processing time (processing delay) of the process A in the MC 2*b*.

The frequency controller 25 also lowers the operation frequencies of the cores 2*a* as control on the cores 2*a*. As a result, the power consumed by the processor 2 can be reduced.

[1-3] Example of Operation:

Next, description will now be made in relation to examples of the operation of the server 1 according to the one embodiment configured as described above with reference to FIGS. 11 to 13.

Figure 11:
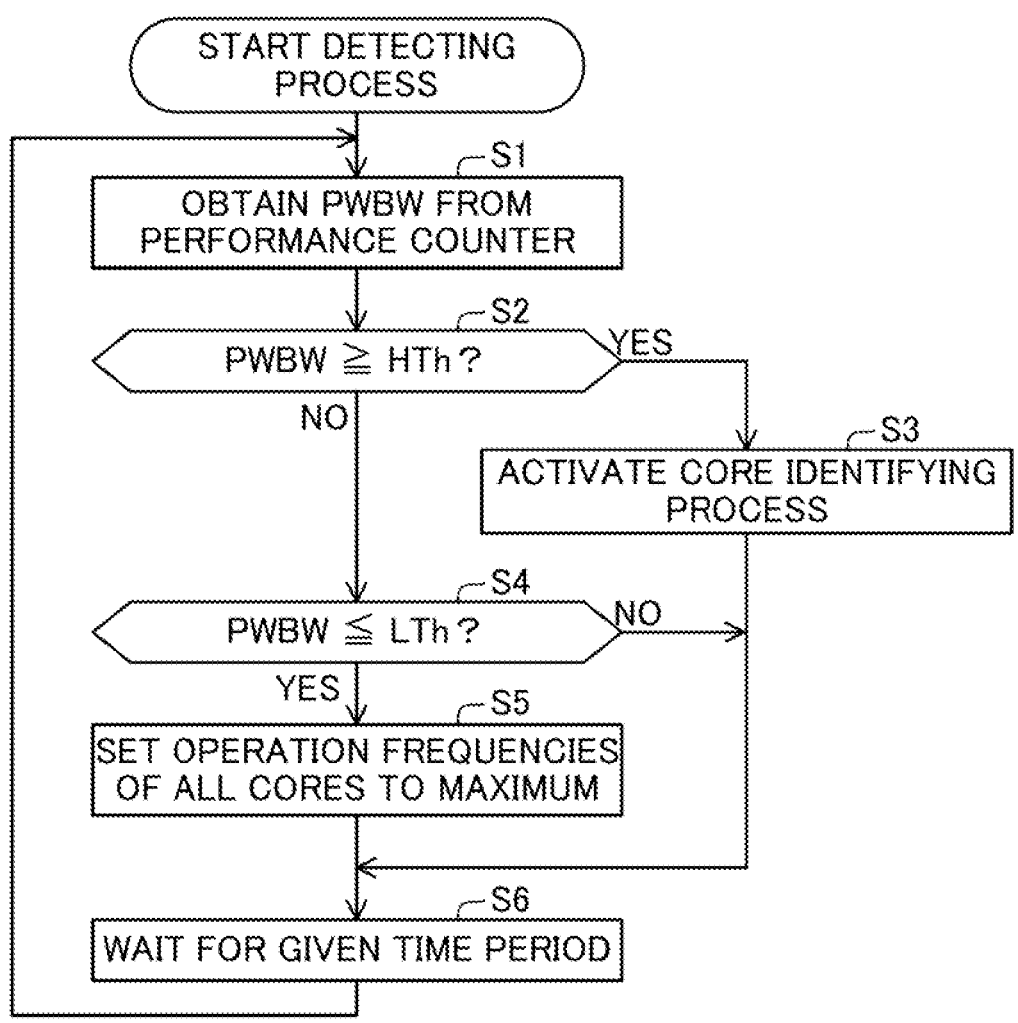
FIG. 11 is a flow diagram illustrating an example of an operation of a detecting process of the one embodiment.

[1-3-1] Example of Operation of Detecting Process:

First, description will now be made in relation to an example of the operation of a detecting processing by the server 1 with reference to FIG. 11. FIG. 11 is a flowchart illustrating an operation example of the detecting process.

As illustrated in FIG. 11, upon activation of the control process 20 of the server 1, the detector 21 obtains a PWBW from the performance counter (Step S1).

The detector 21 determines whether the obtained PWBW is equal to or larger than the high threshold HTh (Step S2). If determining the PWBW to be equal to or larger than the high threshold HTh (YES in Step S2), the detector 21 starts the core identifying process by instructing the core identifier 22 to identify a core 2*a* (Step S3), and the process proceeds to Step S6.

If determining the PWBW not to be equal to or larger than the high threshold HTh (NO in Step S2), the detector 21 determines whether or not the PWBW is equal to or less than the low threshold LTh (Step S4). If determining the PWBW not to be equal to or smaller than the low threshold LTh (NO in Step S4), the process proceeds to Step S6. In this case, the current setting for the writing frequency into the PMEM 4 is maintained.

If determining the PWBW to be equal to or smaller than the low threshold LTh (YES in Step S4), the detector 21 instructs the frequency controller 25 to set the operation frequencies of all the cores 2*a* to the maximum (Step S5), and the process proceeds to Step S6. In this case, the frequency controller 25 sets values that maximize the operation frequencies in the register value for controlling the operation frequency of each of all the cores 2*a*.

In Step S6, the detector 21 waits for a given period of time, and the process proceeds to Step S1.

Figure 12:
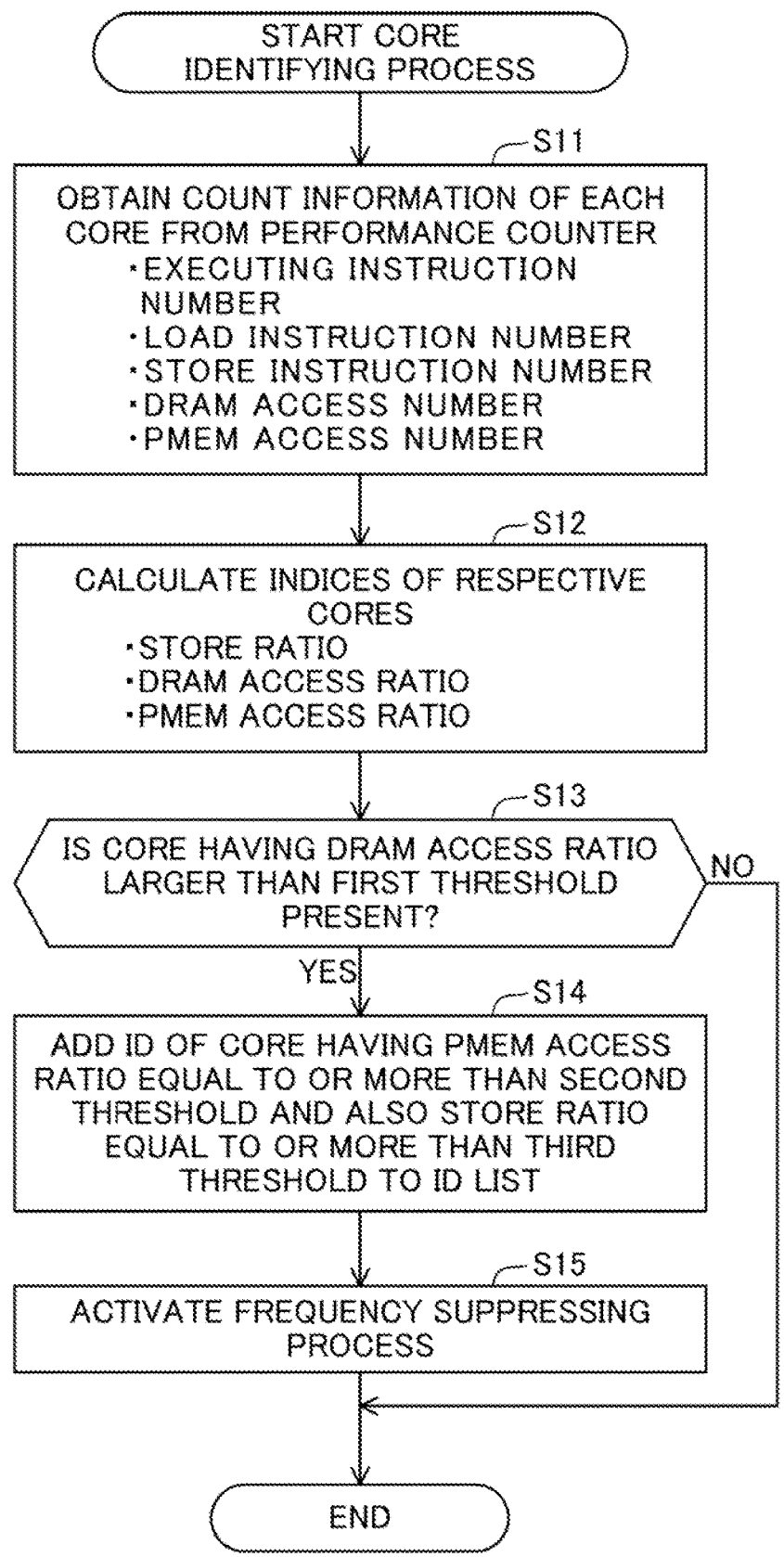
FIG. 12 is a flow diagram illustrating an example of an operation of a core identifying process of FIG. 11.

[1-3-2] Example of Operation of Core Identifying Process:

Next, description will now be made in relation to an example of an operation of a core identifying process illustrated in Step S3 of FIG. 11 with reference to FIG. 12. FIG. 12 is a flowchart illustrating an example of an operation of a core identifying process.

As illustrated in FIG. 12, the core identifier 22 obtains the count information of each detector 21 from the performance counter (Step S11). The count information may include, for each core 2*a*, the executing instruction number, the load instruction number, the store instruction number, the DRAM access number, and the PMEM access number.

The core identifier 22 calculates the indices of the respective cores 2*a* based on the obtained count information (Step S12), and stores as a calculation result 23 into the storage area. Example of the indices are a store ratio, a DRAM access ratio, and a PMEM access ratio that are described above.

The core identifier 22 determines whether a core 2*a* having a DRAM access ratio larger than the first threshold is present (Step S13). If the core identifier 22 determines that a core 2*a* having a DRAM access ratio larger than the first threshold is not present (NO in Step S13), the process ends.

If determining that a core 2*a* having a DRAM access ratio larger than the first threshold is present (YES in Step S13), the core identifier 22 adds the ID of a core 2*a* having a PMEM access ratio equal to or larger than the second threshold and also having a store ratio equal to or larger than the third threshold to the ID LIST 24 (Step S14), Then, the core identifier 22 starts a frequency suppressing process by notifying the ID LIST 24 to the frequency controller 25 (Step S15), and then the process ends.

Figure 13:
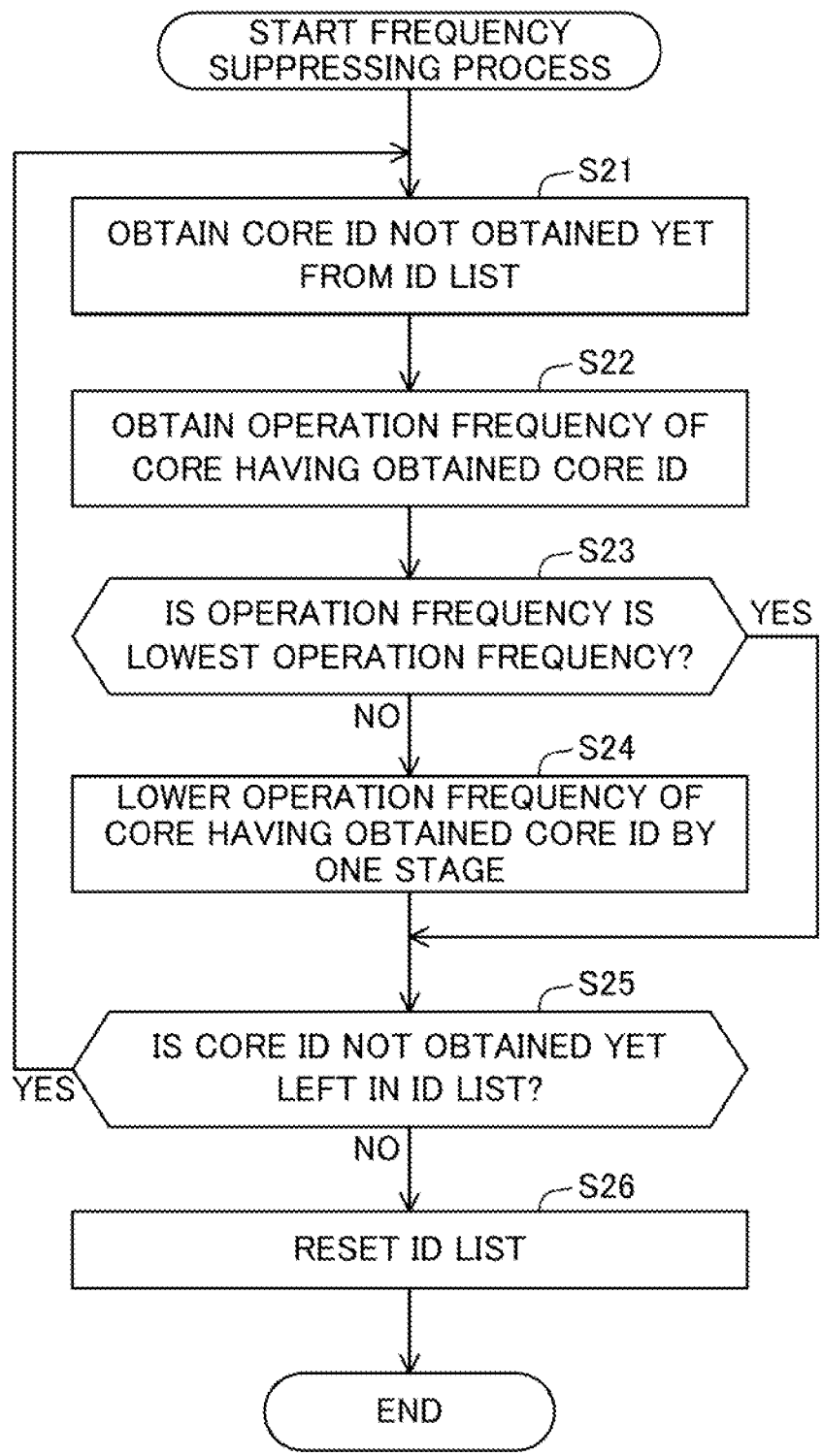
FIG. 13 is a flow diagram illustrating an example of an operation of a frequency suppressing process of FIG. 12.

[1-3-3] Example of Operation of Frequency Suppressing Process:

Next, description will now be made in relation to an example of an operation of a frequency suppressing process illustrated in Step S15 of FIG. 12 with reference to FIG. 13. FIG. 13 is a flowchart illustrating an example of an operation of a frequency suppressing process.

As illustrated in FIG. 13, upon receipt of the ID LIST 24 from the core identifier 22, the frequency controller 25 obtains (extracts) core IDs that have not been obtained yet from the ID LIST 24, for example, sequentially from the top of the ID LIST 24 (Step S21).

The frequency controller 25 obtains the operation frequency of the core 2*a* having the obtained core ID (Step S22). For example, the frequency controller 25 may obtain the operation frequency by referring to the register value of the core 2*a* in question by means of software.

The frequency controller 25 determines whether the obtained operation frequency is the lowest operation frequency (Step S23). If the frequency controller 25 determines that the obtained operation frequency is the lowest operation frequency (YES in Step S23), the process proceeds to Step S25.

If determining that the obtained operation frequency is not the lowest operation frequency (NO in Step S23), the frequency controller 25 lowers the operation frequency of the core 2*a* of the obtained core ID by one stage (Step S24). For example, the frequency controller 25 may lower the operation frequency by one stage by changing the register values of the core 2*a* in question by means of software.

Then, the frequency controller 25 determines whether a core ID that has not been obtained yet is left in the ID LIST 24 (Step S25). If the frequency controller 25 determines that a core ID that has not been obtained yet is left in the ID LIST 24 (YES in Step S25), the process proceeds to Step S21.

If determining that a core ID that has not been obtained yet is not left in the ID LIST 24 (NO in Step S25), the frequency controller 25 resets the ID LIST 24 (Step S26) and the process ends.

[1-4] Modification:

The technique according to the one embodiment described above can be implemented by modifying or modifying as follows.

In the one embodiment, description is made in relation to an example of a method in which the control process 20 suppresses the writing frequency into the PMEM 4 by lowering the operation frequency of the core 2*a* identified by the core identifier 22, but the method is not limited thereto.

Figure 14:
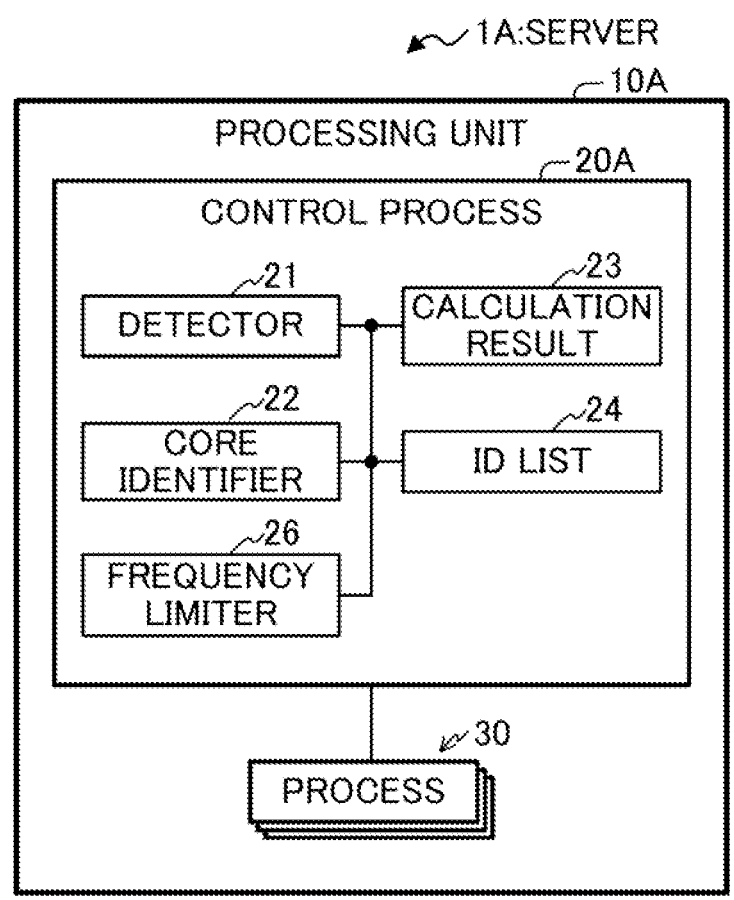
FIG. 14 is a block diagram schematically illustrating an example of a functional configuration of a server according to a modification of the one embodiment.

As an alternative method of suppressing the writing frequency into the PMEM 4, a frequency limiter 26 may be used in place of the frequency controller 25 as illustrated in FIG. 14.

FIG. 14 is a block diagram schematically illustrating a functional configuration of a server 1A according to a modification of the one embodiment. As illustrated in FIG. 14, in a processing unit 10A of the server 1A, a control process 20A may include the frequency limiter 26 in place of the frequency controller 25.

The frequency limiter 26 carries out control to lower the frequency of outputting access requests for the PMEM 4 which requests are output from the core 2a. For example, the 6 frequency limiter 26 limits the memory access frequency to the PMEM 4 by the respective core 2a for each core 2a included in the ID LIST 24.

Each core 2a can limit the memory access frequency that the core 2a outputs to the DRAM 3 or the PMEM 4 in accordance with, for example, a register value of a register implemented on the core 2a or an instruction such as a command from the software.

Accordingly, the frequency limiter 26 can change the memory access frequency for each core 2a by changing the register value for the core 2a by means of software or by notifying the limit value for the core 2a by means of software.

For example, the server 1A may execute the frequency suppressing process of Step S15 of FIG. 12 by notifying the frequency limiter 26 of the ID LIST 24 from the core identifier 22 in Step S14 of FIG. 12. The processes performed by the detector 21 and the core identifier 22, and the contents of the calculation result 23 and the ID LIST 24 are the same as those of the one embodiment.

Figure 15:
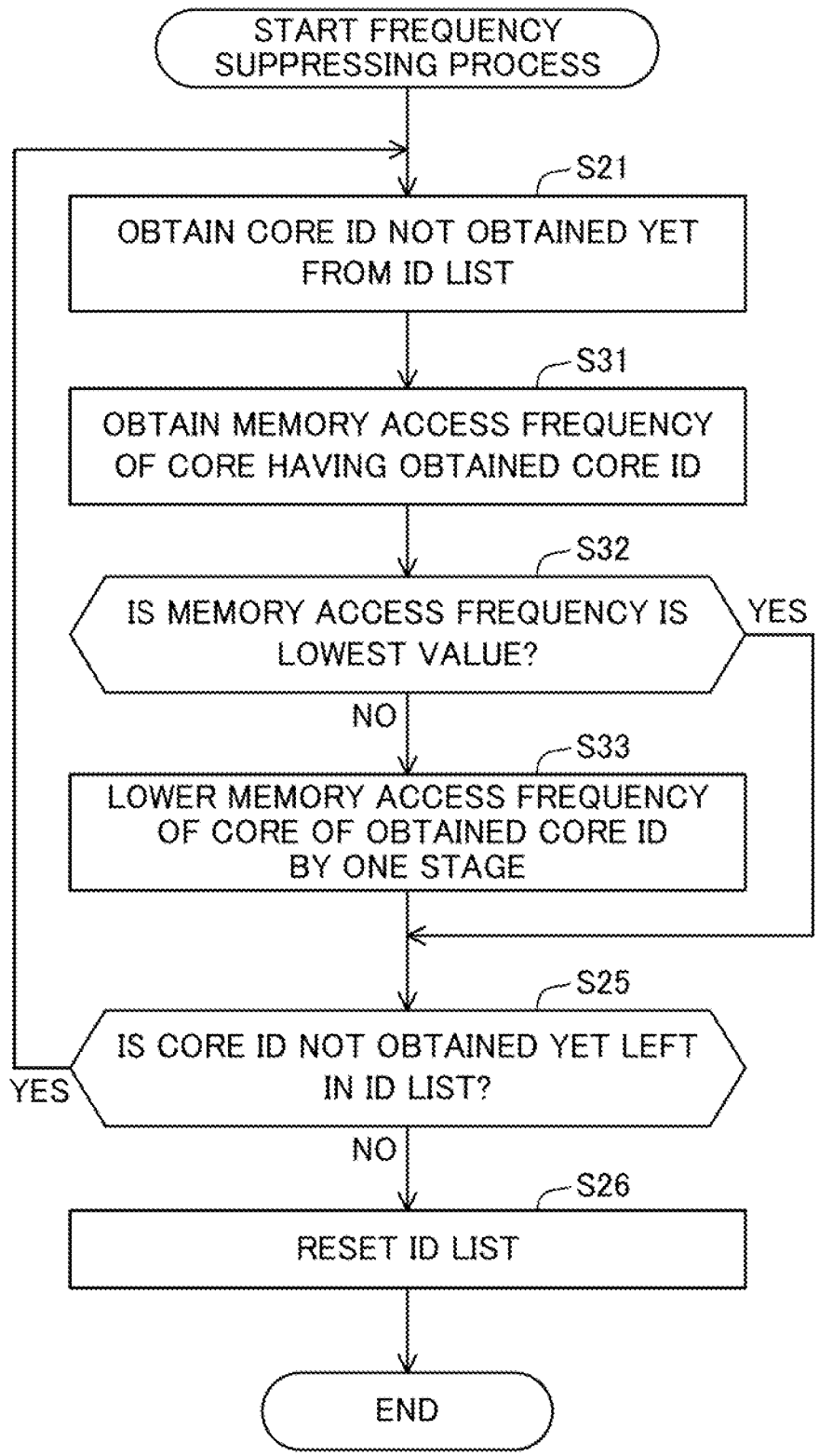
FIG. 15 is a flow diagram illustrating an example of an operation of a frequency suppressing process according to the modification to the one embodiment.

FIG. 15 is a flowchart illustrating an example of an operation of a frequency suppressing process according to the modification. As illustrated in FIG. 15, the frequency limiter 26 obtains the memory access frequency of the core 2a of each core ID obtained in Step S21 (Step S31).

The frequency limiter 26 determines whether the obtained memory access frequency is the lowest value (the lowest settable memory access frequency) (Step S32). If the frequency limiter 26 determines that the obtained memory access frequency is the lowest value (YES in Step S32), the process proceeds to Step S25.

If determining that the obtained memory access frequency is not the lowest value (NO in Step S32), the frequency limiter 26 lowers the memory access frequency of the core 2a of the obtained core ID by one stage (Step S33) and the process proceeds to Step S25.

For example, the frequency limiter 26 may lower the memory access frequency by one stage by changing the register value of the core 2a in question by means of software or by notifying the core 2a in question of the limit value of the memory access frequency from 6 software. The "one stage" may be, for example, the smallest unit that can be changed in a register value, or may be a given frequency, or a given ratio of the core 2a to the maximum memory access frequency.

Thus, the frequency limiter 26 is an example of a suppressing processor that suppresses the write frequency of data to the PMEM 4 by controlling the second core 2a (the first controller) that accesses the PMEM 4 according to the result of monitoring the state of writing data into the PMEM 4.

As described above, also the server 1A according to the modification can achieve a fair memory access between the process A that accesses the DRAM 3 and the process B that performs highly-frequent writing into the PMEM 4. Therefore, it is possible to suppress the occurrence of conflicts between the process A and the process B in the MC 2b, and it is possible to reduce the processing time (processing delay) of the process A in the MC 2b.

In addition, according to the server 1A of the modification, the writing frequency into the PMEM 4 by the core 2a can be directly limited. Consequently, it is possible to suppress the lowering the processing performance of the processor 2 more rapidly (in a shorter time) than the one embodiment in which the writing frequency into the PMEM 4 is indirectly suppressed while the consumption power of the processor 2 is lowered by lowering the operation frequency of the core 2a.

[2] Miscellaneous:

Techniques according to the one embodiment and the modification described above can be modified and implemented as follows.

For example, in the server 1 illustrated in FIG. 6, the functions of the detector 21, the core identifier 22, and the frequency controller 25 of the control process may be merged in any combination, or may be each divided. Also in the server 1A illustrated in FIG. 14, the functions of the detector 21, the core identifier 22, and the frequency limiter 26 of the control process 20A may be merged in any combination, or may be each divided.

In the server 1 illustrated in FIG. 6, the control process 20 may further include the frequency limiter 26 depicted in FIG. 14. In this alternative, both the frequency controller 25 and the frequency limiter 26 may carry out control on the control 2a included in ID LIST 24 at control amounts according to the respective ratios set for the frequency controller 25 and the frequency limiter 26. Further alternatively, one of frequency controller 25 and the frequency limiter 26 may carry out the control on each core 2a according to a predetermined setting or the calculation result 23. These alternatives can also achieve the same effects as those of the one embodiment or the modification.

In one aspect, it is possible to suppress performance degradation in an information processing apparatus including a processor having a shared memory controller that controls accesses to the first and second memories different in processing speed.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus comprising:
a first memory having a first processing speed;
a second memory having a second processing speed less than the first processing speed; and
a processor,
the processor comprising:
   a memory controller that is coupled to the first memory and the second memory and that controls an access to the first memory and an access to the second memory; and
   a plurality of cores that access the first memory or the second memory via the memory controller,
the processor is configured to:
   detect an access amount of the processor to the second memory;
   when the access amount is more than a first value, determine whether a first core among the plurality of cores accesses the first memory;

when the first core accesses the first memory, suppress deterioration of performance of the first core by lowering an accessing frequency of a second core that accesses the second memory, the deterioration being caused by a conflict of accesses in the memory controller that controls an access of the first core to the first memory and an access of the second core to the second memory, the second core being one among the plurality of cores; and when the first core does not access the first memory, suppress execution of lowering of the accessing frequency of the second core.

2. The information processing apparatus according to claim 1, wherein the access amount is a writing bandwidth to the second memory.

3. The information processing apparatus according to claim 1, wherein the processor is further configured to increase an operation frequency of each of the plurality of cores in a case where the accessing frequency of the processor to the second memory is equal to or less than a third value smaller than the first value.

4. The information processing apparatus according to claim 1, wherein the processer is configured to:

identify a second core of the plurality of cores accessing the second memory with accessing frequency more than a second value, and suppress an accessing frequency of the second core to the second memory.

5. The information processing apparatus according to claim 4, wherein the suppressing the accessing frequency of the second core is to lower an operation frequency of the second core.

6. A non-transitory computer-readable recording medium having stored therein a control program that causes a computer to execute a process, the computer comprising a first memory having a first processing speed; a second memory having a second processing speed less than the first processing speed; and a processor comprising a memory controller that is coupled to the first memory and the second memory and that controls an access to the first memory and an access to the second memory, and the processor further comprising a plurality of cores that access the first memory or the second memory via the memory controller, the process comprising:

detecting an access amount of the processor to the second memory;

when the access amount is more than a first value, determining whether a first core among the plurality of cores accesses the first memory;

when the first core accesses the first memory, suppressing deterioration of performance of the first core by lowering an accessing frequency of a second core that accesses the second memory, the deterioration being caused by a conflict of accesses in the memory controller that controls an access of the first core to the first memory and an access of the second core to the second memory, the second core being one among the plurality of cores, and when the first core does not access the first memory, suppressing execution of lowering of the accessing frequency of the second core.

7. The non-transitory computer-readable recording medium according to claim 6, wherein the access amount is a writing bandwidth to the second memory.

8. The non-transitory computer-readable recording medium according to claim 6, wherein the process further comprises increasing an operation frequency of each of the plurality of cores in a case where the accessing frequency of the processor to the second memory is equal to or less than a third value smaller than the first value.

9. The non-transitory computer-readable recording medium according to claim 6, wherein the process comprises:

identifying a second core of the plurality of cores accessing the second memory with accessing frequency more than a second value, and suppressing an accessing frequency of the second core to the second memory.

10. The non-transitory computer-readable recording medium according to claim 9, wherein the suppressing the accessing frequency of the second core is to lower an operation frequency of the second core.

11. A computer-implemented method carried out by a computer including a first memory, a second memory, and a processor, the computer-implemented method comprising:

detecting an access amount of the processor to the second memory having a second processing speed less than a first processing speed of the first memory, the processor including a memory controller that is coupled to the first memory and the second memory and that controls an access to the first memory and an access to the second memory, and the processor including a plurality of cores that access the first memory or the second memory via the memory controller;

when the access amount is more than a first value, determining whether a first core among the plurality of cores accesses the first memory;

when the first core accesses the first memory, suppressing deterioration of performance of the first core by lowering an accessing frequency of a second core that accesses the second memory, the deterioration being caused by a conflict of accesses in the memory controller that controls an access of the first core to the first memory and an access of the second core to the second memory, the second core being one among the plurality of cores, and when the first core does not access the first memory, suppressing execution of lowering of the accessing frequency of the second core.

* * * * *